United States Patent [19]

Ebersberger

[11] Patent Number: 4,504,965
[45] Date of Patent: Mar. 12, 1985

[54] ROTARY ANODE X-RAY TUBES

[75] Inventor: Hans Ebersberger, Markt Erlbach, Fed. Rep. of Germany

[73] Assignee: Siemens Aktiengesellschaft, Berlin & Munich, Fed. Rep. of Germany

[21] Appl. No.: 447,700

[22] Filed: Dec. 7, 1982

[30] Foreign Application Priority Data

Dec. 16, 1981 [DE] Fed. Rep. of Germany ....... 3149936

[51] Int. Cl.³ .......................... H01J 35/04; H01J 35/10
[52] U.S. Cl. ..................................... 378/132; 378/125
[58] Field of Search ........................ 378/131, 132, 125

[56] References Cited

U.S. PATENT DOCUMENTS

| | | |
|---|---|---|
| 2,090,582 | 8/1937 | Mesick ................................ 378/131 |
| 2,336,769 | 12/1942 | Atlee . |
| 3,878,395 | 4/1975 | Seifert et al. . |
| 4,167,671 | 9/1979 | Boden et al. . |
| 4,468,801 | 8/1984 | Sudo et al. ........................... 378/132 |

Primary Examiner—Alfred E. Smith
Assistant Examiner—T. N. Grigsby
Attorney, Agent, or Firm—Hill, Van Santen, Steadman & Simpson

[57] ABSTRACT

In the case of tubes with magnetically mounted anodes, it is difficult to obtain an adequately stable mounting of the anode shaft for all stresses to be expected, in particular, in the case of tilting and pivoting. To this end, the disclosure provides that magnetically conductive pole pieces are inserted in the wall of the tube envelope at the locations at which magnets are exteriorly disposed which pole pieces are in magnetic coupling relation with the anode arrangement. The distances between the parts to be magnetically coupled can thereby be substantially reduced, so that there results—in relation to known magnetic bearings—a substantially more stable support-mounting of the rotary anode in the high vacuum envelope. The disclosure is, in particular, applicable in the case of X-ray tubes for utilization in medical X-ray technology.

6 Claims, 6 Drawing Figures

ROTARY ANODE X-RAY TUBES

BACKGROUND OF THE INVENTION

The invention relates to rotary anode X-ray tubes according to the preamble of patent claim 1. Tubes of this type are known e.g. from U.S. Pat. No. 3,878,395.

In the case of the rotary anode X-ray tubes disclosed in the afore-cited U.S. patent, whose anode is magnetically mounted, the requirement exists of reinforcing the support-mounting in order to be able to execute, with the tube also in operation, the movements conventional in medical X-ray technology. Up to the present time comparatively large distances have been necessary between the support-mounting magnets and the parts of the anode to be support-mounted in relation to the effectiveness of the magnets. A shortening of the distances, through which an improvement of the effect of the magnets, and hence of the support-mounting, would be possible, cannot be achieved because the wall of the envelope through which the support-mounting proceeds requires a specified sturdiness, i.e. thickness, on account of the vacuum.

SUMMARY OF THE INVENTION

The invention has presented itself with the objective of improving the stability of the mounting of the rotary anode in the case of rotary anode X-ray tubes according to the preamble of patent claim 1. This objective is achieved in accordance with the invention through the measures disclosed in the characterizing clause of claim 1. Advantageous further developments and designs of the invention are subjects of the sub-claims.

Through the introduction of magnetically conductive parts (pole pieces) into the wall of the X-ray envelope, the length of the non-magnetic gap between the parts to be magnetically coupled can be substantially reduced. This results in a substantially more stable mounting of the rotary anode in the high vacuum envelope of the tube. The reduction of the gap also yields the possibility of simplifying the mounting, the drive, and the control of the anode in such a fashion that the costs for the necessary electricity are approximately 20% to 40% lower than in the case of utilization of an envelope without pole pieces therein. Approximately a proportional dependency of the costs upon the mounting gap results.

Although, from U.S. Pat. No. 2,336,769, the utilization of pole pieces was already known for a long time, which pole pieces were to be inserted in the wall of a metal (steel) tube envelope in order to guarantee the effect of the drive motor of a rotary anode of X-ray tubes even in the case of utilization of the metal envelope, in the intensively pursued development of glass rotary anode X-ray tubes with ball bearings and in the development of magnetic bearings which were of substantial interest for rotary anodes in X-ray tubes, up to the present time no introduction of such magnetic parts has resulted in the case of magnetic bearings. This is obviously based on the fact that the conventional tubes, at least in the region of the drive motor, consist of insulating material, in particular, glass, in the case of which the introduction of pole pieces was not considered necessary for the drive.

In the case of utilization of an X-ray envelope, consisting of electrically insulating non-magnetic material, such as glass or ceramic material for example, the inventive utilization of pole parts as inserts in the tube wall can proceed in such a fashion that, at the support-mounting locations, the tube envelope is provided with apertures which are filled in a vacuum-tight fashion by the pole pieces. As construction material, to be employed at least in the region of the bearing for the anode, electrically insulating material is preferred because the transmission losses to be expected in metal, caused by leakage fields and eddy currents are thereby avoidable.

As pole pieces, for example, soft-magnetic materials can be employed and, on account of the good magnetic flux carrying capacity, in particular such materials which consist of bundles of metal sheets placed against one another (laminated pole pieces). Instead of metal sheets, also wire pieces can be placed with their longitudinal axes parallel next to one another. Also pieces which consist of ferrite can be employed. What is significant in the case of the pole pieces is only that, between the magnetic parts and the wall of the envelope, a vacuum-tight, durable connection is produced even in the case of operation of the X-ray tube.

In another design the apertures of the envelope wall can be only partially carried out in that the material, at those locations at which pole pieces are to be applied, is removed while leaving a thin wall necessary for keeping the envelope sealed vacuum-tight. Into the thus-obtained cavities, the pole pieces can then be introduced, or magnets inserted, respectively. A suitable cavity can also be obtained with an aperture which is provided with a thin covering which is sealed during operation of the X-ray tubes, for example a metal sheet.

Further details and advantages of the invention shall be explained in the following on the basis of the exemplary embodiments illustrated in the Figures. on the accompanying drawing sheet; and other objects, features and advantages will be apparent from this detailed disclosure and from the appended claims.

DETAILED DESCRIPTION

Figure 1:
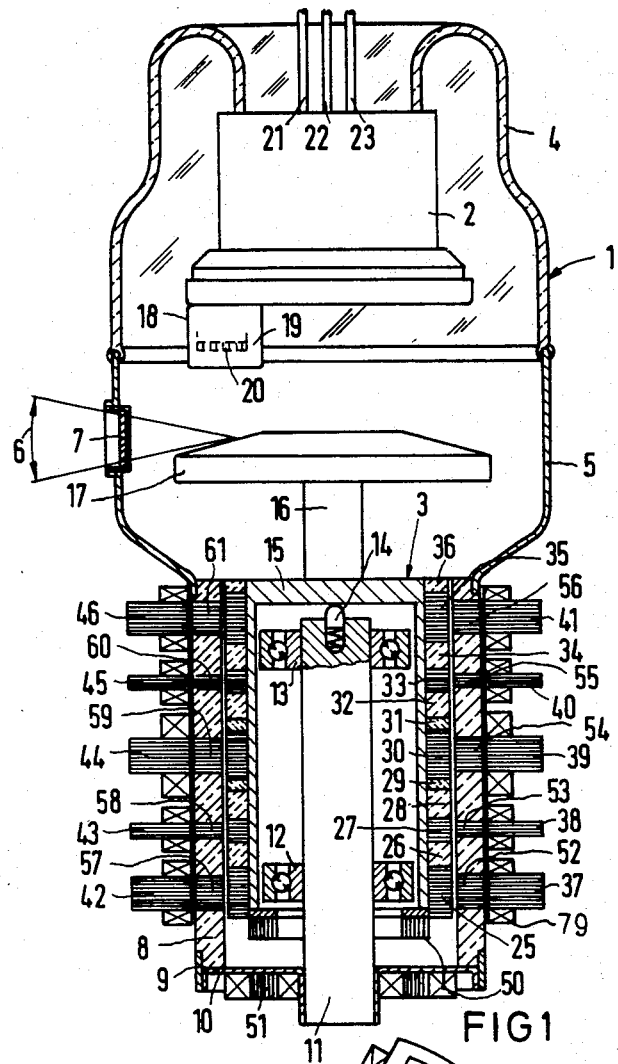
In FIG. 1 an overall sectional diagram of a rotary anode X-ray tube is illustrated whose magnetic bearing is improved through the introduction of pole pieces in the envelope wall.

In FIG. 1, reference numeral 1, designates the vacuum envelope of a rotary anode X-ray tube. In this envelope 1, at the one end, a cathode arrangement 2, and, at the opposite end, an anode arrangement 3, is mounted in a manner known per se. The envelope 1 itself, at the end at which the cathode arrangement 2 is disposed, consists of a glass part 4, an intermediate piece 5 of Vacon (a nickel-cobalt-iron-alloy), in which, at the exit of the X-ray beam 6, a window 7 of a beryllium (Be) is inserted. At its free end the part consisting of metal is continued by means of a glass or ceramic part 8 at whose end a metal tube 9 is secured which is sealed with a lid 10 likewise consisting of metal. The part 10 possesses a central opening in which a connection piece 11 is inserted which extends into the envelope and bears ball bearings 12 and 13, as well as an electrical contact 14 at its center which contact provides an electrical connection to a rotor 15 at the upper end of which, via a shaft 16, the actual anode 17 is mounted in conventional fashion. For the generation of X-rays a cathode 18 is disposed opposite the anode 17, which cathode exhibits, in a shielding housing 19, a thermionic cathode 20 which can be supplied with current via connections 21, 22 and 23.

Figure 2:
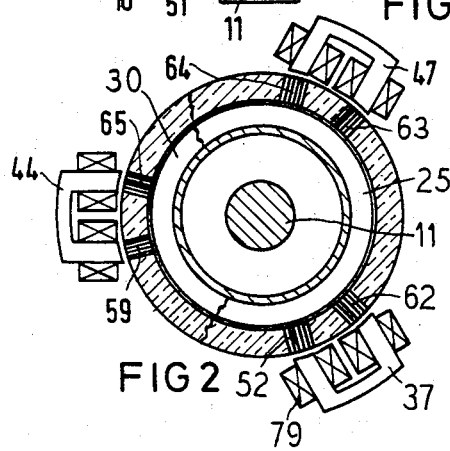
In FIG. 2 a diagrammatic cross section of the magnetic bearing employed in FIG. 1 is illustrated; and In FIGS. 3 through 6 sections of the envelope wall of rotary anode X-ray tubes are illustrated at locations at which different designs of pole pieces are inserted.

The rotor of the anode possesses, at its exterior cylindrical surface, an arrangement comprising a magnetic sheet metal stack 25, an intermediate piece 26 of ceramic material, an additional magnetic sheet metal stack 27, an intermediate piece 28 of ceramic, an additional intermediate piece 29 of ceramic, an additional magnetic sheet metal stack 30, as well as additional intermediate pieces 31, 32, as well as a magnetic sheet metal stack 33, an intermediate piece 34 of ceramic as well as a stack 35, and an end piece 36 of ceramic material. Disposed opposite the stacks 25, 27, 30, 33, and 35, at the exterior side of the tube are electromagnets 37 through 41, as well as 42 through 46, and a corresponding third arrangement, not visible in FIG. 1. In FIG. 2, the magnet referenced with 47 of such third arrangement is visible. In the case of vertical support-mounting of the anode, there is disposed, at the lower end of the rotor 15, an annular stack 50 opposite which an additional stack 51 is disposed which pertains to an electromagnet.

In FIG. 1, between the stack 25 and the electromagnet 37, a pole piece 52 is introduced in the wall of the part 8. The pole piece 53 pertains to the magnet 38, the pole piece 54 pertains to the magnet 39, the pole piece 55 pertains to the magnet 40, and the pole piece 56 pertains to the magnet 41. The pole piece 57 pertains to the magnet 42, the pole piece 58 pertains to 43, the pole piece 59 pertains to the magnet 44, the pole piece 60 pertains to the magnet 45, the pole piece 61 pertains to the magnet 46. In the sectional view of FIG. 2 additional pole piece 62 for the electromagnet 37, as well as pole pieces 63, 64 and 65 for the magnets 44 and 47, are visible.

In one of the embodiments according to FIGS. 1 and 2, the pole pieces comprise adjacently arranged wire pieces of magnetic material which are interconnected and sealed together by means of a solder, and which penetrate the wall 8 perpendicularly.

With a construction basically corresponding to the magnetic bearing according to U.S. Pat. No. 4,167,671, the mode of operation of the pole pieces of the present invention results simply from the fact that the fields are applied from the exterior by means of the electromagnets via the metal sheets or wires of magnetic material which form the pole pieces, so that the magnetic flux lines supplied to the rotor 15 have a stronger influence on the sheet metal stacks 25, 27, 30, 33, and 35 which provide the magnetic material of the rotor. The stacks 25 and 35 here represent parts of the magnetic bearing; the stacks 27 and 33 represent parts of the sensors which serve the purpose of controlling the bearing; and the stack 30 represents a part of the drive motor.

Figure 3:
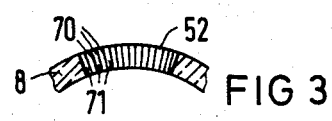

The construction of a pole piece employed according to FIGS. 1 and 2 is illustrated enlarged in FIG. 3. The wall of the envelope consists of a glass or ceramic part 8, whereas the pole piece 52 consists of metal sheets or wires 70 and connecting intermediate material 71, as has already been explained in detail above.

Figure 4:
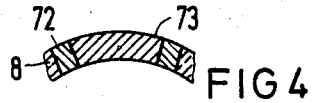

With a design according to FIG. 4, an insert 73 as pole piece can be inserted in a glass or ceramic part 8 via a connection ring 72. The ring 72 can consist of nickel-, cobalt-, iron-, (Ni, Co, Fe) or nickel-chromium-iron- (Ni, Cr, Fe) or nickel-iron- (Ni, Fe) alloy, and the pole piece 73 can consist of soft-magnetic material.

Figure 5:
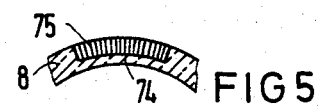
Figure 6:
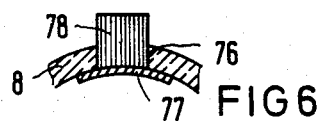

According to FIG. 5 the wall 8 of ceramic material or glass is only partially apertured so that an approximately 0.5 mm thick part 74 remains on the interior side of the wall. On the exterior a pole piece 75 is then inserted which corresponds to that which is illustrated in FIG. 3. As already explained in the specification, a correspondingly effective design can also be obtained in that, according to FIG. 6, there is introduced into the ceramic or glass wall 8, an opening 76 which is closed and sealed toward the interior by a metal sheet 77 with soft-magnetic properties, which sheet is approximately 0.1 mm thick and, like the ring 72, consists of a nickel alloy. From the exterior, then either corresponding to FIG. 5, a pole piece corresponding to 75 can be inserted, or a pole 78 of an electromagnet such as 37 with a winding such as 79 directly thereon, can be introduced, respectively.

It will be apparent that many modifications and variations may be made without departing from the scope of the teachings and concepts of the present invention.

I claim as my invention:

1. A rotary anode X-ray tube comprising a tube envelope having magnets disposed at the exterior thereof, and a magnetically mounted rotary anode within said tube envelope and rotatably journalled by means of said magnets, characterized in that magnetically conductive pole pieces are inserted in the wall of the tube envelope at the locations at which said magnets are disposed at the exterior for providing a magnetic flux path of magnetic material for coupling of said magnets with said rotary anode.

2. A rotary anode X-ray tube according to claim 1, characterized in that the envelope wall, at least in the region of the pole pieces, consists of electrically insulating material, such as glass or ceramic material.

3. A rotary anode X-ray tube according to claim 1, characterized in that the pole pieces consist of magnetically conductive metal parts, such as metal sheets or wires, which are parallel and adjacently disposed, and are connected with one another and with the envelope wall in a vacuum-tight fashion.

4. A rotary anode X-ray tube according to claim 1, characterized in that the pole pieces consist of soft-magnetic material.

5. A rotary anode X-ray tube according to claim 1, characterized in that the envelope wall has recesses aligned with the magnets which recesses only partially penetrate the wall thickness, said pole pieces being inserted into said recesses.

6. A rotary anode X-ray tube according to claim 1, characterized in that the envelope wall has openings therethrough aligned with the magnets, a magnetically conductive sheet sealing said openings at the interior side of the envelope wall, and said pole pieces being inserted in said openings.

* * * * *